US010003672B2

(12) United States Patent
Fu et al.

(10) Patent No.: US 10,003,672 B2
(45) Date of Patent: Jun. 19, 2018

(54) APPARATUS, SYSTEMS AND METHODS FOR DEPLOYMENT OF INTERACTIVE DESKTOP APPLICATIONS ON DISTRIBUTED INFRASTRUCTURES

(71) Applicant: Cisco Technology, Inc., San Jose, CA (US)

(72) Inventors: Tianying Fu, San Jose, CA (US); Gaurav Manglik, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 34 days.

(21) Appl. No.: 13/759,514

(22) Filed: Feb. 5, 2013

(65) Prior Publication Data
US 2013/0151598 A1    Jun. 13, 2013

Related U.S. Application Data

(63) Continuation-in-part of application No. 13/489,223, filed on Jun. 5, 2012, which is a continuation-in-part
(Continued)

(51) Int. Cl.
*H04L 29/06* (2006.01)
*G06F 9/54* (2006.01)
*G06F 9/455* (2018.01)

(52) U.S. Cl.
CPC .............. *H04L 67/42* (2013.01); *G06F 9/452* (2018.02); *G06F 9/54* (2013.01); *G06F 9/45533* (2013.01)

(58) Field of Classification Search
CPC ... H04L 67/42; H04L 29/08072; H04L 29/06; H04L 29/0809
(Continued)

(56) References Cited

U.S. PATENT DOCUMENTS 6,718,535 B1    4/2004    Underwood
7,028,218 B2    4/2006    Schwarm et al.
(Continued)

OTHER PUBLICATIONS

"Third-Party Submission under 37 CFR 1.290 Concise Description of Relevance," filed in U.S. Appl. No. 14/497,196 on Feb. 18, 2015.

*Primary Examiner* — Nicholas Taylor
*Assistant Examiner* — Chong G Kim
(74) *Attorney, Agent, or Firm* — Ronald Fernando

(57) ABSTRACT

Embodiments disclosed facilitate adaptation of interactive desktop applications (IDAs) for deployment and execution on distributed systems including clouds. In some embodiments, the method comprises: executing a cloud-based IDA on a dedicated elastic Virtual Machine (VM) running on at least one of a plurality of cloud infrastructures using a remote client device; and invoking an application on the remote client device comprising a remote desktop protocol (RDP) to connect to the VM on the at least one cloud infrastructure to facilitate remote user interaction with the at least one cloud-based IDA using functionality provided by the RDP. In some embodiments, the remote client application may be a web browser and RDP may be implemented using browser plugins. Further, the remote client application may sync data with cloud infrastructure before and after IDA execution, and the VM running the IDA may be terminated when user exits the IDA.

21 Claims, 4 Drawing Sheets

Related U.S. Application Data of application No. 13/024,302, filed on Feb. 9, 2011, now Pat. No. 8,862,933.

(60) Provisional application No. 61/501,726, filed on Jun. 27, 2011.

(58) Field of Classification Search
USPC ........................................................ 709/203
See application file for complete search history.

(56) References Cited

U.S. PATENT DOCUMENTS

| | | | |
|---|---|---|---|
| 7,523,190 B1 | 4/2009 | Bickerstaff et al. | |
| 7,809,975 B2 | 10/2010 | French et al. | |
| 7,849,350 B2 | 12/2010 | French et al. | |
| 7,853,767 B2 | 12/2010 | Maki et al. | |
| 8,090,979 B2 | 1/2012 | Watanabe et al. | |
| 8,176,208 B2 | 5/2012 | Shishido et al. | |
| 8,250,215 B2 | 8/2012 | Stienhans et al. | |
| 8,386,839 B2 | 2/2013 | Watanabe et al. | |
| 8,489,918 B2 | 7/2013 | Watanabe et al. | |
| 8,904,005 B2 | 12/2014 | Ferris et al. | |
| 2002/0013895 A1 | 1/2002 | Kelley et al. | |
| 2002/0120741 A1 | 8/2002 | Webb et al. | |
| 2004/0098458 A1 | 5/2004 | Husain et al. | |
| 2007/0083650 A1 | 4/2007 | Collomb et al. | |
| 2007/0186212 A1* | 8/2007 | Mazzaferri ........... G06F 9/5027 718/1 |
| 2007/0260702 A1* | 11/2007 | Richardson et al. ......... 709/217 | |
| 2008/0268828 A1* | 10/2008 | Nagaraja ................ G06F 9/505 455/419 |
| 2009/0216975 A1* | 8/2009 | Halperin et al. .............. 711/162 | |
| 2009/0300151 A1 | 12/2009 | Friedman et al. | |
| 2010/0042720 A1* | 2/2010 | Stienhans et al. ............ 709/226 | |
| 2010/0061250 A1 | 3/2010 | Nugent | |
| 2010/0070319 A1 | 3/2010 | Prafullchandra et al. | |
| 2010/0088150 A1 | 4/2010 | Mazhar et al. | |
| 2010/0125476 A1 | 5/2010 | Yeom et al. | |
| 2010/0125844 A1 | 5/2010 | Mousseau et al. | |
| 2010/0191796 A1 | 7/2010 | Almeida et al. | |
| 2010/0228819 A1 | 9/2010 | Wei | |
| 2010/0235830 A1* | 9/2010 | Shukla et al. ..................... 718/1 | |
| 2010/0269048 A1* | 10/2010 | Pahlavan ............. G06F 9/4445 715/740 |
| 2010/0325278 A1* | 12/2010 | Heim ................... G06F 9/4856 709/226 |
| 2010/0325284 A1* | 12/2010 | Heim ..................... H04L 67/14 709/227 |
| 2011/0126192 A1* | 5/2011 | Frost ........................ G06F 8/61 717/178 |
| 2011/0138295 A1* | 6/2011 | Momchilov .......... G06F 9/4445 715/740 |
| 2011/0138314 A1* | 6/2011 | Mir ....................... G06F 9/4445 715/779 |
| 2011/0185292 A1* | 7/2011 | Chawla et al. ............... 715/760 | |
| 2011/0320821 A1 | 12/2011 | Alkhatib et al. | |
| 2012/0089980 A1* | 4/2012 | Sharp ................. G06F 9/45558 718/1 |
| 2012/0131591 A1 | 5/2012 | Moorthi et al. | |
| 2012/0158803 A1 | 6/2012 | Kandasamy et al. | |
| 2012/0159459 A1 | 6/2012 | Turner et al. | |
| 2012/0179820 A1* | 7/2012 | Ringdahl et al. ............. 709/225 | |
| 2012/0180049 A1* | 7/2012 | Tsai ................... G06F 9/45558 718/1 |
| 2012/0203823 A1 | 8/2012 | Manglik et al. | |
| 2012/0239739 A1 | 9/2012 | Manglik et al. | |
| 2012/0254966 A1* | 10/2012 | Parker .............................. 726/7 | |
| 2012/0331528 A1 | 12/2012 | Fu et al. | |
| 2013/0239106 A1* | 9/2013 | Srinivasan .......... G06F 9/45558 718/1 |
| 2014/0040656 A1 | 2/2014 | Ho et al. | |
| 2014/0040883 A1* | 2/2014 | Tompkins ........................ 718/1 | |
| 2014/0372533 A1 | 12/2014 | Fu et al. | |
| 2015/0039770 A1 | 2/2015 | Manglik et al. | |
| 2015/0121078 A1 | 4/2015 | Fu et al. | |

\* cited by examiner

APPARATUS, SYSTEMS AND METHODS FOR DEPLOYMENT OF INTERACTIVE DESKTOP APPLICATIONS ON DISTRIBUTED INFRASTRUCTURES

CROSS REFERENCES TO RELATED APPLICATIONS

This application is a continuation-in-part of and claims the benefit of and priority under 35 U.S.C. § 120 to copending U.S. patent application Ser. No. 13/489,223 filed Jun. 5, 2012, entitled "Apparatus, Systems and Methods for Dynamic Adaptive Metrics Based Application Deployment on Distributed Infrastructures," which, in turn, is a continuation-in-part of U.S. patent application Ser. No. 13/024,302 filed Feb. 9, 2011, entitled "Apparatus, Systems and Methods for Deployment and Management of Distributed Computing Systems and Applications". U.S. patent application Ser. No. 13/489,223 above also claims the benefit of U.S. Provisional Application 61/501,726 filed Jun. 27, 2011 entitled "Apparatus, Systems and Methods for Optimal Deployment and Management of Distributed Computing Systems and Applications." The aforementioned applications are all hereby incorporated by reference, in their entireties, for all purposes.

BACKGROUND

Field of the Invention

The present invention relates to the field of distributed computing and in particular, to apparatus, systems, and methods to deploy and run interactive desktop applications on distributed computing systems in a manner that facilitates remote user interaction with the deployed running application on the distributed computing system.

Description of Related Art

The performance of computing applications may often be increased by distributing the computational workload across nodes in a networked cluster of computers. A physical networked cluster of computers is often referred to as a "cloud" or "cloud infrastructure" or simply an infrastructure. Clouds often permit their underlying physical hardware, which can include servers, memory, storage, and network resources, to be viewed as virtualized units. These virtualized units represent some fraction of the underlying computing hardware or resources supported by the cloud. Therefore, from a logical perspective, clouds may be viewed as a collection of virtual machines ("VMs"). A "cloud node" or "node" may be responsible for the control and operation of one VM or some fraction of the VMs, and there may be several nodes per cloud. Typically, a cloud may provide a variety of VM types with different computing (CPU), memory, storage, networking, and Operating System (OS) options.

Clouds, thus, may be viewed as services that provide access to infrastructure remotely, including compute, storage and network resources, so that the resources can be reserved, provisioned, accessed and released programmatically. For example, programmatic interfaces such as Application Programming Interfaces (APIs), System Development Kits (SDKs), Web Services, etc. may be used to access resources made available by clouds remotely over a wide-area network (WAN). For example, in publicly available clouds or "public clouds", these resources can be accessed programmatically over the Internet and are made available as VMs on a pay-per-use basis.

Cloud-computing infrastructures offer several benefits over fixed on-premise datacenters, server farms, desktop computers, etc (collectively referred to as "organizational infrastructure") including: greater geographic and temporal availability because of access over the Internet and fault tolerance built into the infrastructure by providers; increased agility for deploying applications because of the availability of cloud resources as VMs and virtualization, which permits "snapshots" of VM images at a point in time and the ability to move the VMs to different physical machines; greater scalability because the large size of many cloud infrastructures typically permits both more resources per application and more applications at any given time; cost savings and infrastructural efficiency because organizational infrastructure can be optimized for typical business situations, while allowing large mission-critical applications to be run on public cloud infrastructures, which would be cost prohibitive for most organizations.

Although cloud computing has gained in popularity, users running traditional interactive desktop applications have often been limited to running the applications on the physical local machines on which the interactive desktop applications have been installed. Thus, users running traditional interactive desktop applications have hitherto been unable to take advantage of the flexibility, high availability and compute resources provided by clouds.

Therefore, there is a need for apparatus, systems, and methods to deploy and run interactive desktop applications on distributed computing infrastructures including clouds.

SUMMARY

Consistent with embodiments disclosed herein, apparatus, systems and methods for deploying and running interactive applications on distributed computing infrastructures are presented. In some embodiments, a method may comprise executing at least one cloud based interactive desktop application (IDA) on a Virtual Machine (VM) running on at least one of a plurality of cloud infrastructures; and invoking an application on a remote client device to connect to the VM on the at least one cloud infrastructure to facilitate remote user interaction with the at least one cloud-based IDA, wherein the application on the remote client device comprises a remote desktop protocol suite, which facilitates remote user interaction with cloud based IDA. The remote client device may be a tablet computer, a handheld computer; a smartphone, a netbook, and/or a laptop.

In some embodiments, the remote user interaction may comprise: displaying a Graphical User-Interface (GUI) associated with the cloud based IDA on the remote client device; and sending user input associated with the cloud-based IDA from the remote client device to the cloud-based IDA. Further, in some embodiments, the remote user interaction may occur through a web browser application on the remote client device and the remote desktop protocol suite may be provided by a browser plugin. In some embodiments, the remote desktop protocol suite may comprise a presentation layer protocol, a framebuffer protocol, a terminal services protocol, and/or a proprietary desktop sharing protocol.

In some embodiments, executing the at least one cloud based interactive desktop application (IDA) on the VM may comprise synchronizing data files between the remote client and the cloud-based IDA. For example, the data files may comprise input data files and output data files and synchronizing data files between the remote client and the cloud-based IDA may further comprise: copying input data files from the remote client device to cloud-based storage used by the cloud-based IDA as part of an initialization routine associated with the cloud-based IDA, wherein the input data files are used by the cloud-based IDA during execution; and copying output data files from the cloud-based storage used by the cloud based IDA to the remote client device as part of a termination routine associated with the cloud-based IDA, wherein the output data files are output by the cloud-based IDA.

In some embodiments, the VM may be dedicated to run the IDA and may be dynamically brought up immediately prior to executing the cloud-based IDA and dynamically torn down immediately following termination of the cloud-based IDA. In some embodiments, the cloud based IDA for the at least one cloud infrastructure may be derived from an infrastructure independent representation of the IDA by utilizing at least one cloud specific implementation of the infrastructure independent representation of the IDA, and wherein the at least one cloud-specific implementation of the IDA corresponds to the at least one cloud infrastructure.

Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

DETAILED DESCRIPTION

In accordance with embodiments disclosed herein, apparatus, systems and methods for deploying and running interactive desktop applications on distributed computing systems such as clouds are presented.

Figure 1:
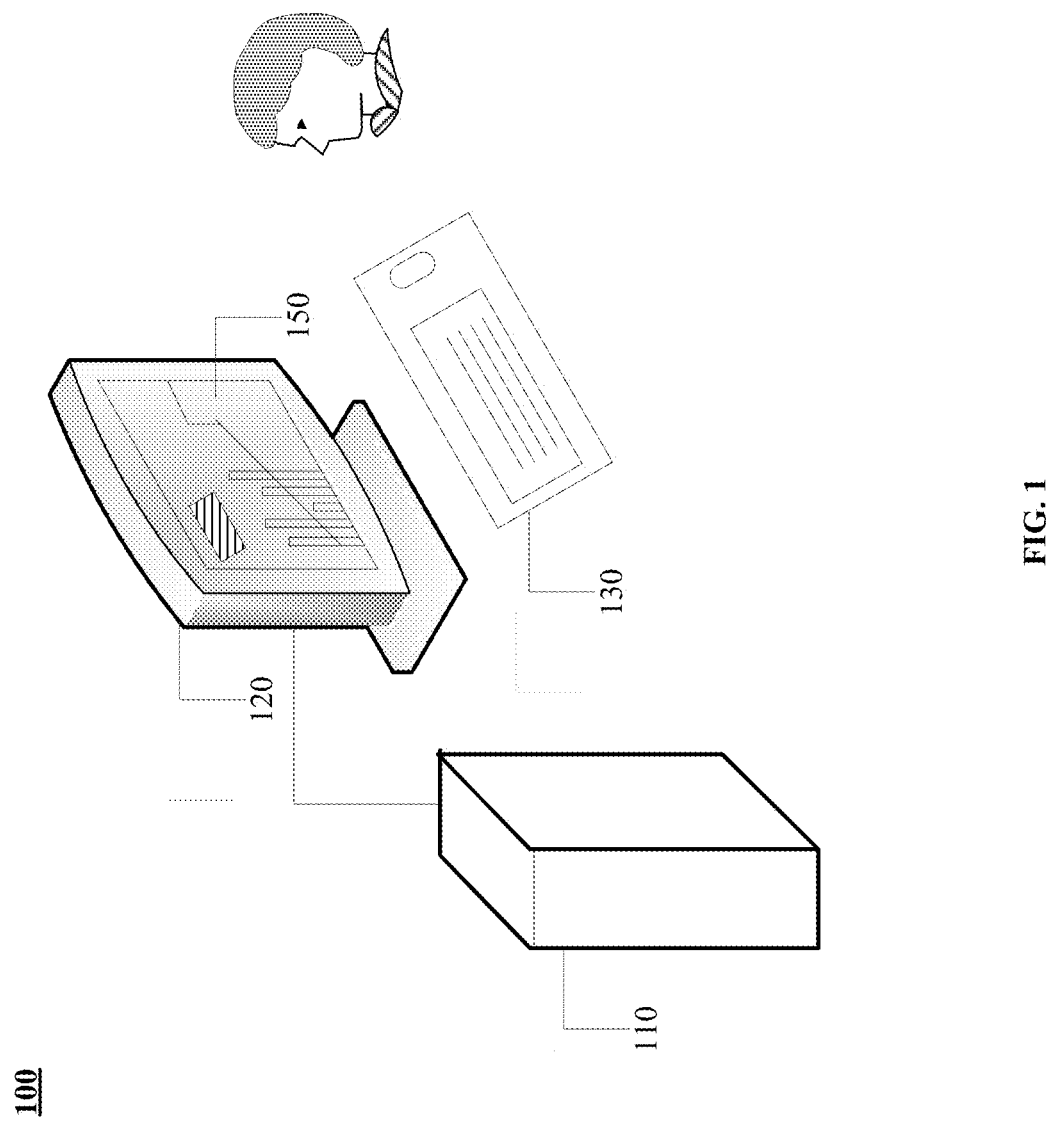
FIG. 1 illustrates user interaction with an exemplary traditional interactive desktop application running on a local computer.

FIG. 1 illustrates user interaction with an exemplary traditional Interactive Desktop Application (not shown) running on a local computer system 110. The term "desktop application" is used to collectively refer to typical applications that are run locally on a single computer such as exemplary local computer system 110, for example, by a user at a terminal coupled to the computing system.

Interactive desktop application (IDA), for example, be a Graphical User Interface (GUI) based program such as office suites from (including desktop publishing, spreadsheets, presentation programs, etc), finance and/or accounting programs, educational/scientific/engineering applications, simulations and modeling, or any other application program that runs locally on computer system 110 and may involve user interaction with the GUI presented by the appropriate program.

Desktop application as used herein also refers to applications that generate and/or use GUIs for user interaction rather than those built with web interfaces that allow user-interaction through a web browser. For example, in many traditional IDAs, such as the presentation program PowerPoint from Microsoft, use of the IDAs capabilities is only available on the local desktop and a native interface is not provided for access over the web. User input may be received using input device 130. Typically, desktop applications work with local resources including data, files that reside on local storage devices such as hard disks or other such storage media that may be coupled to and/or resident on to local computer system 110. The term interactive is used to refer to an application that may request user interaction at/during runtime.

Local computer system 110 may be a workstation, personal computer, desktop computer, notebook, laptop computer, or any computing device with a processor, memory, storage, including removable storage/media, input-output (I/O) devices, and/or other resources that is capable of running an interactive desktop application. Local computer system may be coupled to a network (not shown) and to monitor 120 and one or more I/O devices 130.

For a typical IDA running on exemplary computer 110, a user may launch the IDA directly using an exemplary local input device 130, such as a keyboard and mouse coupled to local computer system 110. In the situation above, the IDA runs on local computer system 110 and uses using physical resources on local computer system 110. FIG. 1 also shows the GUI/console 150 generated during the running of IDA on monitor/display device 120, which may be coupled to local computer system 110. GUI/console 150 may request user-input and/or a user may provide input during runtime for the IDA.

Typically, in order to run an IDA on local computer system 110, the user copies any input data or files that the IDA may use and may then launch the IDA, for example, by double-clicking on the appropriate application icon in a window on the desktop of local computer system 110. Next the user may interact with the IDA through application GUI 150. User interaction with the IDA may include keyboard, pointing device, or touchscreen input, providing input parameters, configuring runtime application settings, pointing the application to input data and files, etc. as may be possible or requested by the IDA through application GUI 150. After configuration and receiving appropriate user input, the IDA may perform various computation tasks. During the computation, IDA may save (persist) output, data, and/or files on local storage and permit result(s) to be visualized via GUI interface 150. After running the IDA, the user may close the application, which exits. However, local computing system 110 may continue to execute any other running tasks or applications.

Typical IDAs suffer from several drawbacks. For example, they may not be easily accessible remotely. Moreover, access to the IDA may depend on access to the local computer system 110. If local computer system 110 is down or has a malfunction, users may be unable to run the IDA. The performance of the IDA may also depend on the load of local computer system 110. For example, if local computer system 110 is busy with other tasks, the performance of an IDA running on the local computer system may be significantly degraded. Additionally, it may be expensive or impractical to scale or upgrade the capabilities of local computer system in a manner commensurate with the data or problem size addressed by the IDA. Thus, using traditional IDAs on a local computer system may constrain and limit users in an organization, thereby preventing the organization from realizing the full potential and value from use of the IDA.

In embodiments disclosed herein, apparatus, systems and methods to adapt IDAs for deployment and execution on distributed computing systems such as clouds are presented. Embodiments of apparatus, systems and methods described herein pertain to the deployment and execution of adapted cloud-based IDAs on distributed systems and may help address one or more drawbacks of traditional IDAs. The term cloud-based is used to refer to a traditional IDA that has been adapted for deployment and execution on a distributed computing system such as a cloud in a manner consistent with disclosed embodiments.

Figure 2:
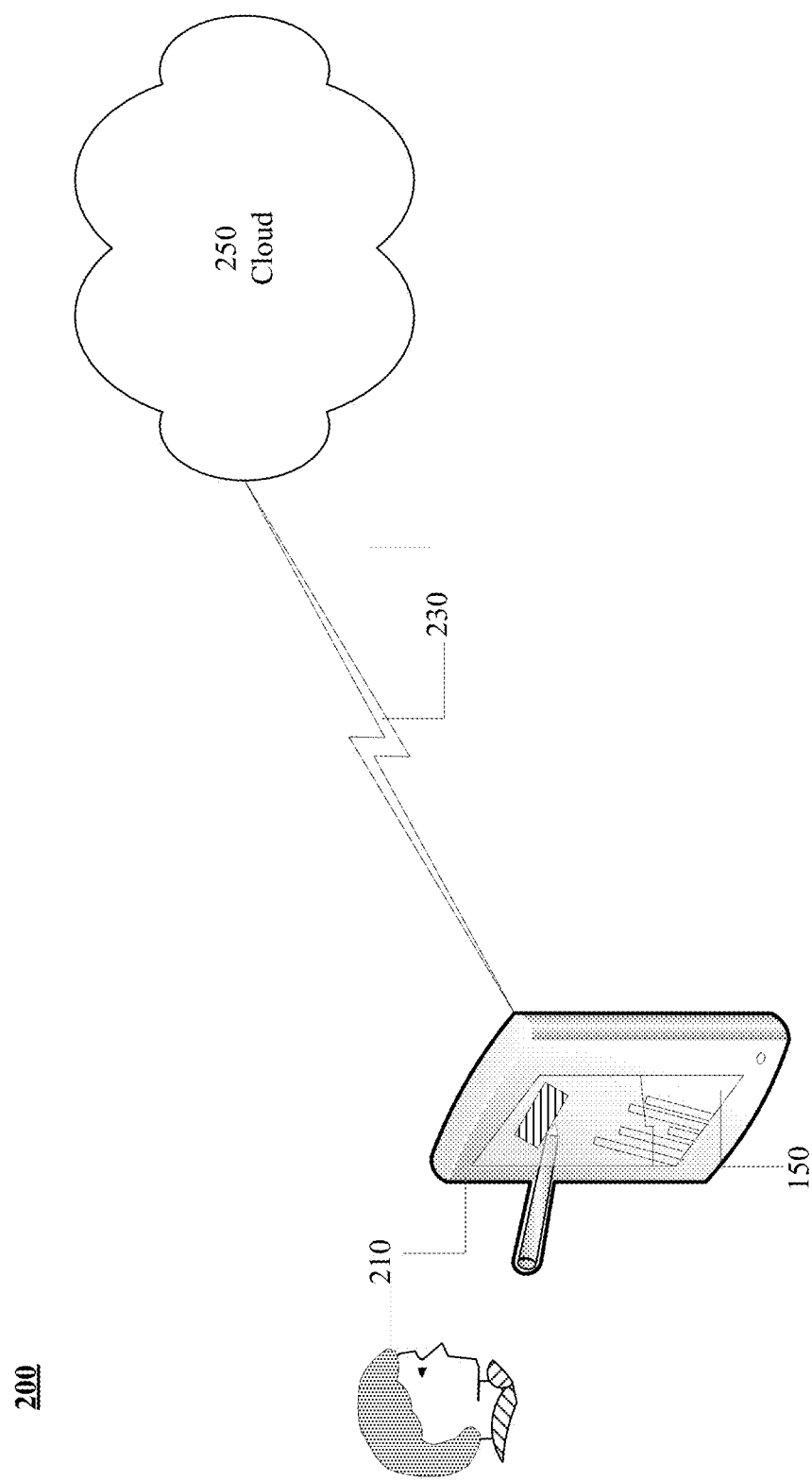
FIG. 2 depicts an exemplary user view of an interactive desktop application adapted for deployment and execution on a cloud.

FIG. 2 depicts an exemplary user view of an IDA adapted for deployment and execution on a cloud in a manner consistent with disclosed embodiments. As shown in FIG. 2, when interactive desktop application (not shown) is adapted for deployment and execution on a distributed system such as cloud 250 in a manner consistent with disclosed embodiments, then, a user may use remote client 210 to run and interact with the cloud-based IDA.

In some embodiments, remote client 210 may take the form of a thin client. Thin clients refer to computing devices that typically have limited computing resources. In some instances, thin clients may depend wholly or partially on another computer or server for processing and computation. In some instances, thin clients may be devices with less computing power and resources relative to a desktop such as (but not limited to) smartphones, netbooks, handhelds, and tablet computers.

In some embodiments, remote client 210 may be equipped with one or more communications interfaces including, but not limited to, networking modules, modems, receivers, transmitters, transceivers and/or satellite communication modules to permit the device to communicate over a wired and/or wireless network with applications running on cloud 250. In general, remote client 210 may take the form of any computing device with capable of communicating with and displaying a GUI associated with a cloud-based IDA deployed and running on distributed computing systems such as clouds.

As shown in FIG. 2, remote client 210 may display output/results and also accept user input using GUI 150. User input may be relayed to cloud-based IDA running on cloud 250 and output/results generated by the cloud-based IDA may be received by remote client 210 and displayed using GUI 150.

In some embodiments, communication between remote client 210 and cloud 250 may occur over link 230, using one or more communications interfaces on remote client 210, which may be wired or wireless. For example, communications interfaces on remote client 210 may facilitate the use of Wi-Fi (based on the IEEE 802.11 family of standards or variants thereof) using wireless access points, and/or over mobile communication networks such as 3rd Generation mobile telecommunication ("3G") and/or 4th Generation mobile telecommunication ("4G") networks (such as Long Term Evolution ("LTE"), LTE Advanced, or Wi-Max and variants thereof) using one or more supported communication protocols over wireless link 230. In some embodiments, communications interfaces on remote client 210 may also support the use of Ethernet, Bluetooth, Near Field Communication (NFC), and/or various other techniques to relay data and commands between remote client 210 and Cloud 250 which runs cloud-based IDA. In some embodiments, links 230 may be secure and/or any communication over links 230 may be encrypted.

As shown in FIG. 2, deployment and execution of an IDA (not shown) on cloud 250 in a manner consistent with disclosed embodiments may be transparent to the user. Accordingly, in some embodiments, a user may be unaware that cloud-based IDA is running on cloud 250 and user may continue to interact with the application using GUI 150 on remote client 210 as if the application were local.

In some implementations, the user may be able to run and interact with the cloud-based IDA remotely. For example, in structural engineering, agricultural, oil and gas, or logistics applications, where data is often generated remotely in the field, a user may collect data in the field, upload the collected data from the remote location to cloud 250 using remote client 210, run cloud-based IDA on cloud 250 and view the results of execution through GUI 150 using remote client 210.

Figure 3:
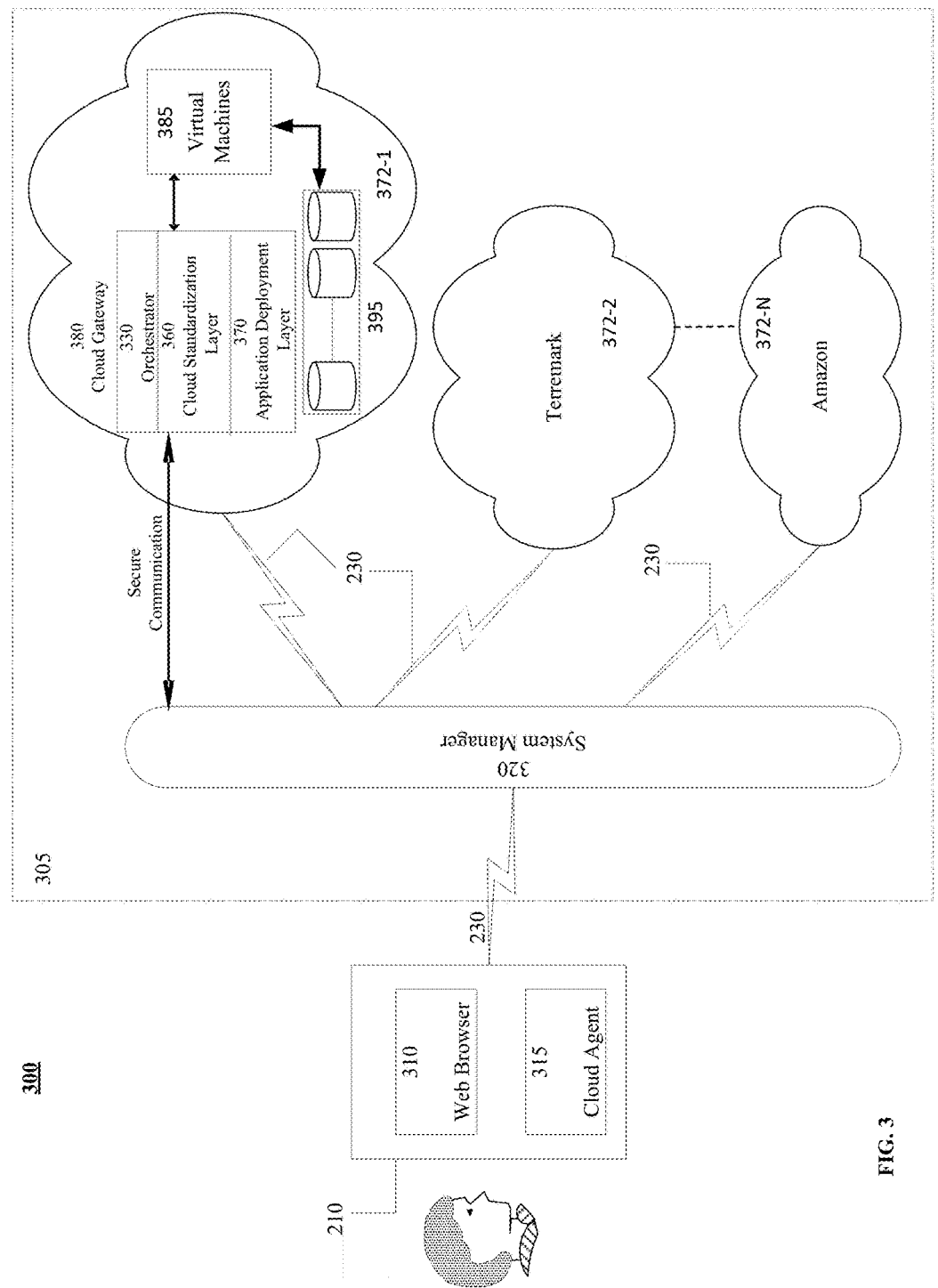
FIG. 3 shows an exemplary block diagram illustrating an exemplary system for deploying and running adapted interactive desktop applications on distributed systems such as clouds.

FIG. 3 shows an exemplary block diagram illustrating an exemplary system 300 for deploying and running a cloud-based IDA on distributed systems such as clouds.

In some embodiments, prior to deployment and execution, IDAs may be imported and adapted for deployment in system 300. For example, the IDAs may be adapted and imported into system 300 using, at least in part, an application importer module (not shown). In some embodiments, application importer module may help describe the IDAs being imported using System Manager 320 in a manner that facilitates their adaptation for deployment and execution on Clouds 372.

In some embodiments, application descriptors may be used, in part, to describe the IDAs being imported. Application descriptors may include various primitives such as pattern, system, and run-time primitives, which may describe the execution patterns as well as node, storage, communication and network characteristics of the IDA.

Exemplary application descriptors may include information such as: application software and hardware requirements, application profile (whether memory intensive, Input-Output intensive, CPU intensive, etc.), specification of a computing paradigm, application steps, firewall rules, etc. These descriptors, primitives and other features have also been described in greater detail in co-pending U.S. patent application Ser. No. 13/024,302 filed Feb. 9, 2011, entitled "Apparatus, Systems and Methods for Deployment and Management of Distributed Computing Systems and Applications," and in co-pending U.S. patent application Ser. No. 13/489,223, filed Jun. 5, 2012, entitled "Apparatus, Systems and Methods for Dynamic Adaptive Metrics Based Application Deployment on Distributed Infrastructures," which have been incorporated by reference in their entireties into the present application.

In some embodiments, application descriptors, including primitives and other parameters for deploying and executing cloud-based IDAs may be specified in one or more application templates. For example, application templates for an IDA may specify one or more of: a name for the application; a version number; a description; an icon or logo to represent the application; minimum hardware requirements—such as, but not limited to, the number of processors, memory, local storage size, network speed, etc; software and runtime requirements—such as—but not limited to the operating system, architecture (e.g. 32 or 64-bit), a command line to run the cloud-based IDA, additional application specific environmental variables, dependency packages, special node initialization scripts, special node clean up scripts; etc. Note that one or more of the parameters listed above may be optional. Accordingly, in some embodiments, not all of the parameters listed above may be specified in templates for any given IDA.

In some embodiments, Orchestrator 330 and Cloud Standardization Layer 360 may use the templates and/or application descriptors during the importation process to build and/or provide a cloud agnostic or a cloud-infrastructure independent view of resources for the imported cloud-based IDA. For example, Cloud Standardization Layer 360 may include functional module repositories, which may facilitate the utilization of appropriate available resources (including shared storage, server types, clusters and features such as queues, security, etc.) in the manner specified by imported cloud-based IDAs on each cloud in a cloud-agnostic manner.

In some embodiments, exemplary Cloud Agent 315, which may run on remote client 210, may store data for use by one or more imported cloud-based IDAs during deployment and running of the cloud-based IDAs on system 300. For example, Cloud Agent 315 may synchronize (or "sync") data from a local folder on remote client 210 to cloud-based storage. In some embodiments, one or more of the local folders may be application specific. In some embodiments, each application may have a distinct local folder on remote client 210. In some embodiments, Cloud Agent 315 may keep track of the folders, data and other files used by a specific cloud-based IDA. In some embodiments, Cloud Agent 315 may allow a user to associate folders with individual cloud-based IDAs and specify applications to be executed, as well as other information used by an imported cloud-based IDA through an interface such as exemplary web browser 310.

In some embodiments, a user may use web browser to log in to System Manager 320. Exemplary System Manager 320 may manage user information and coordinate various user tasks with Orchestrator 330. For example, System Manager 320 may receive, maintain, and update user information, cloud information, cloud-based IDA information, and other data such as job history, housekeeping information etc. In some embodiments, System Manager 320 may also facilitate user views of application files and data on shared storage, may move the application files and data to cloud storage, and synchronize the application files and data between clouds. In some embodiments, System Manager 320 may interact with Cloud Agent 320 to sync files and data between remote client 310 and the imported clouds 372.

In some embodiments, the user may interact with System Manager 320 though web browser 310 and select a cloud-based IDA for deployment and execution on one of Clouds 372. In some embodiments, System Manager 320 may then communicate with Orchestrator 330 to begin the process of deployment and execution of the selected cloud-based IDA. In some embodiments, Orchestrator 330 may use a common application representation, based, in part, on functionality provided by Cloud Standardization Layer 360 to deploy and run the user selected cloud-based IDA on any selected cloud. In some embodiments, the common application representation may take the form of the application descriptors, which may be used as input by Orchestrator 330 in deploying and executing the cloud-based IDA.

In some embodiments, Cloud Standardization Layer 360 may include functionality to facilitate standardization of library constructs (such as shared storage, network, cluster, security, etc.) across a variety of Clouds 372. Although Application Deployment Layer 370 may have provider-specific Application Programming Interfaces (APIs) and other infrastructure differences, Cloud Standardization Layer 360 may provide applications a cloud agnostic or a cloud infrastructure-independent view of resources, including compute, storage and network resources. In some embodiments, Cloud Standardization Layer 360 may maintain resource standardizations for various clouds, such as exemplary clouds 372-1, 372-2 . . . 372-N, as well as references to cloud-specific implementations of the standardizations for each cloud 372.

In some embodiments, Orchestrator 330 may facilitate the deployment, running, and monitoring of applications on various clouds. For example, functionality provided by Cloud Standardization Layer 360 permits Orchestrator 330 to use infrastructure independent representations of application code to deploy applications. Orchestrator 330 may dynamically build clusters on a selected cloud 372 for the execution of cloud-based IDA in response to an execute command entered by a user using an interface presented by System Manager 320 through web-browser 310.

Orchestrator 330 may comprise program code that implements algorithms for deploying, optimizing, managing and monitoring application runs on clouds. In some embodiments, routines and other functions performed by Orchestrator 330 may be managed and initiated by the System Manager 320. Orchestrator 330 may also report back the status and results of the various orchestration activities to System Manager 320. In one embodiment, Orchestrator 330 may directly query System Manager for information such as application data, policies, and cloud information.

Cloud Specific Libraries and Cloud APIs may comprise a library of implementations for primitives and composite interfaces, respectively, for a specific cloud 372. In some embodiments, Cloud APIs and Cloud Specific Libraries may be invoked using Application Deployment Layer 370, and using appropriate cloud provider interfaces. For example, cloud provider interfaces in Application Deployment Layer 370 may be used to invoke appropriate Cloud APIs and routines from Cloud Specific Libraries that permit the deployment and running of applications on Clouds 372, where the applications may have been described using application descriptors and standardized primitives from Cloud Standardization Layer 360.

For example, when a cloud-based IDA is to be deployed, Cloud Coordinator/Gateway 380-1 may use Cloud APIs and Cloud Specific Libraries to perform deployment and execution tasks for cloud 372-1. For example, shared storage primitives on Cloud Standardization Layer 360 may lead to launching of a DFS shared storage implementation on an Amazon™ cloud 372-N, while launching the shared storage implementation on a Terremark™ cloud 372-2 will set up NAS/SAN. In general, the cloud independent representation of cloud-based IDA may be deployed on any of clouds 372-$i$, $1 \leq i \leq N$ by using the appropriate cloud-specific Cloud APIs, Cloud Libraries, Cloud Plugins and Coordinator/Gateways 380-$i$.

In some embodiments, the dynamic management of clusters and other cloud resources may be facilitated by using a node management service provided by Cloud Coordinator/Gateway 380 for a specific cloud 172. The node management service may facilitate the addition or removal of nodes. A "cloud node" or "node" may be responsible for the control and operation of some fraction of the VMs 385, and there may be several nodes per cloud.

In some embodiments, the display output and/or GUI of cloud-based IDA running on Cloud 372 may be redirected and/or relayed for display on remote client 210. For example, a remote desktop protocol suite such as one or more of: a presentation layer protocol such as Microsoft Remote Desktop Protocol (MS-RDP); a remote framebuffer protocol such as Virtual Network Computing (VNC), other terminal services protocols, and/or various other proprietary or non-proprietary protocols may be used to permit GUI/output display remotely and remote user interaction with the cloud-based IDA through remote client 210. The term "remote desktop protocol" is used to refer to any desktop sharing protocol (both proprietary and non-proprietary) that permits user input on a remote computer to be received by another computer, which sends and graphical screen updates back to the remote user's computer. Remote desktop protocols include, without limitation, presentation layer protocols, remote framebuffer protocols, and terminal services protocols.

In some embodiments, the GUI/output of the cloud-based IDA may be displayed in a window on remote client 210. For example, a GUI associated with the executing cloud-based IDA may be shown through a window on remote client 210 using a web browser 310. Conversely, the protocol can also send user-input on remote client 210 to the cloud-based IDA.

In some embodiments, various software packages or suites such as the Microsoft Windows based Remote Desktop Protocol, VNC viewer, TeamViewer, or variants thereof may be used to permit GUI/output of the cloud-based IDA to be viewed on remote client 210 and to send GUI-related and/or other user-input from remote client 210 to the cloud-based IDA. In some embodiments, one or more of the above protocols may be integrated into a web browser using one or more plug-ins to the web browser. The term "plug-in", when used in the context of a web browser, is used to refer to any program code that adds to or extends native functionality provided by off the shelf web browsers, such as, but not limited to Mozilla Firefox, Microsoft Internet Explorer, Google Chrome, Opera, Apple Safari, etc. The term plug-in when used in this context also refers to browser add-ons.

In some embodiments, browser window 310 for cloud-based IDA may display a GUI identical to that shown by IDA when running in a traditional desktop environment. In some embodiments, the remote desktop protocols may be used to create an application-centric web-based UI for the adapted cloud-based IDA that is displayed on the remote client through web-browser 310. Accordingly, system 300 may provide an application-centric user experience, where the user's interaction through remote client 210 is focused on interaction with the output/GUI of the cloud-based adapted IDA executing on cloud 372. For example, a user interacting remotely with the cloud-based IDA may see the cloud-based application GUI and output but may not see any other application icons, file managers, task bars, menus, and other items etc that appear when logging in to a traditional desktop.

In some embodiments, once cloud-based adapted IDA has completed execution any results and data output and persisted on cloud-storage 395 by the adapted cloud-based IDA may be synchronized from cloud storage, such as exemplary storage 395, to an appropriate location/folder on remote client 210. In some embodiments, the VM, such as VM 385, running the adapted cloud-based IDA may be torn down after cloud-based adapted IDA has terminated. For example, a special node termination and/or clean-up script may be used by Cloud Coordinator/Gateway 380 to (i) persist the output, results and/or data from cloud-based IDA on cloud storage (ii) tear down VM 385 and/or sever the remote desktop connection.

In some embodiments, after termination, the adapted cloud-based IDA can be immediately made available to other users. In some embodiments, where several users in an organization utilize one or more adapted cloud-based IDAs, System Manager 320 may queue users who desire to use a particular cloud-based adapted IDA. In some embodiments, the VM to run an IDA may be made available to be reused by a different user and any data or settings related to the previous user's run may be cleaned up before the VM is made available for reuse.

Traditionally, conventional systems using remote protocols such as VMware View 5 (Virtual Desktop Infrastructure) and Citrix Desktop Virtualization require user interaction with an entire virtual desktop. These conventional systems are targeted toward creating, managing and maintaining entire desktop computers as virtual machines on virtualized datacenters. End-users use the entire remote desktop virtual machines as local computers. These conventional solutions are more expensive both monetarily and in terms of support resources. In addition, users have to manually manage and install any applications on the virtual desktops. Essentially, the entire computer desktop is available as a virtual machine. Users also have to manage application installs and executions on these desktops. Moreover, as noted earlier, software license and other limitations may prevent one user from using a desktop and/or an application installed on the desktop while another user is logged in to that desktop. In addition, users of conventional remote virtual desktop machines typically have access to all applications residing therein thereby potentially compromising security and confidentiality of data stored on the machines and limiting the ability to restrict access to sensitive applications installed on the virtual desktops.

In some embodiments, system 300 permits adapted cloud-based IDAs to provide an agile application-centric experience for users. For example, users can interact with the running adapted cloud-based IDA application and without the complications from interacting with, creating, and managing an entire virtual desktop environment. So, users are freed from tasks such as OS patches and updates, security, and any application patches and upgrades that go along with changes to the OS, or run-time environment.

In some embodiments, storage related to the cloud-based adapted IDA is handled seamlessly may be local to remote client 210. In some embodiments, cloud storage may be temporary with the data being synchronized between remote client 210 and cloud storage 395 during deployment and execution of the cloud-based IDA. In some embodiments, the cloud-based IDA GUI may be directly accessed using web browser 310 on remote client 210. In some embodiments, cloud-based adapted IDA binaries and other sensitive application-related data may be protected and secured. In some embodiments, VMs 385 for hosting cloud-based adapted IDA may be brought up and torn down dynamically.

Figure 4:
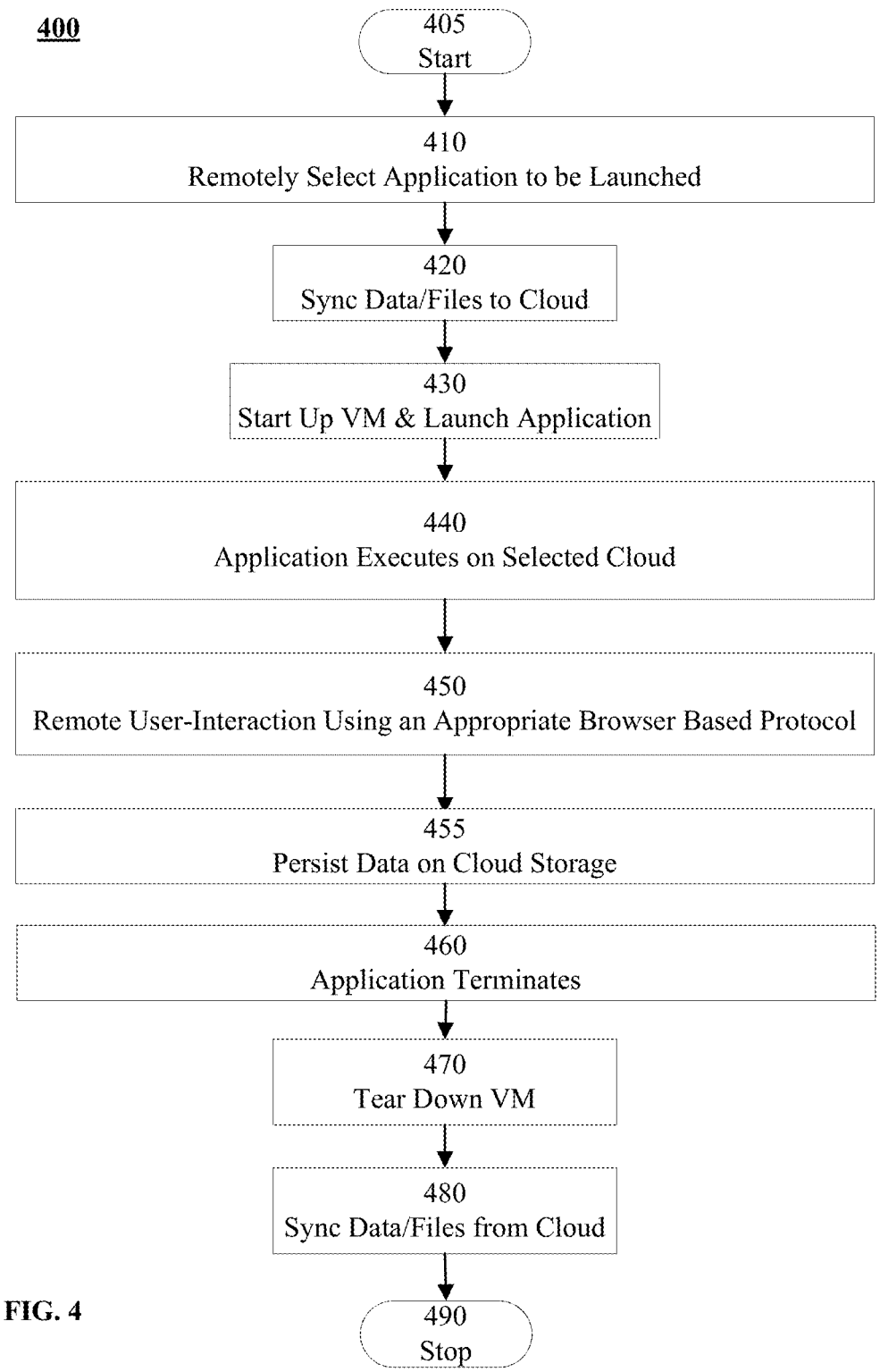
FIG. 4 shows a flowchart illustrating an exemplary method for deploying and running a cloud-based interactive desktop application on distributed computing systems such as clouds in a manner consistent with disclosed embodiments.

FIG. 4 shows a flowchart illustrating an exemplary method 400 for deploying and executing cloud-based IDAs in a manner consistent with disclosed embodiments.

In some embodiments, the process may start in step 405. Next, in step 410, a cloud-based IDA may be remotely selected for launching. In some embodiments, a user may select the cloud-based IDA for launching from remote client 210 using an interface displayed by System Manager 310 on web browser 310. In some embodiments, an icon representing the selected IDA may be tapped to select, deploy and/or launch the IDA on remote client 210. In some embodiments, when the IDA is launched a browser window may be opened and a browser plug-in or agent, which may take the form of Cloud Agent 315, may use stored data such as a user and/or application profile to communicate with System Manager 310 over a network.

In step 420, once the application has been selected for launching, input data/files utilized by the cloud-based IDA may be synchronized with storage on the selected cloud. For example, System Manager 320 may communicate with Cloud Agent 315 on remote client 210 to upload data/files to Cloud Storage 395 on Cloud 372-1. In some embodiments, Cloud Agent 315 may take the form of a browser plug-in for web browser 310.

In step 430, a VM to host/run the selected cloud-based IDA may be started up and the cloud-based IDA may be launched on the VM. In some embodiments, VM 385 may be dynamically started-up on Cloud 372-1. For example, the dynamic bring up of VM 385 on Cloud 372-1 may be facilitated by Cloud Coordinator/Gateway 380-1 in conjunction with System Manager 320 and Orchestrator 360. Further, in some embodiments, a node management service provided by Cloud Coordinator/Gateway 380-1 may facilitate the addition or removal of nodes. In addition, in some embodiments, a special initialization script may be invoked used by Cloud Coordinator/Gateway 380 to bring up VM 385-1 and to perform various housekeeping operations on VM nodes. In some embodiments, VM 385-1 may be dynamically brought up immediately prior to the execution of the cloud-based IDA.

In step 440, the cloud-based IDA executes on the selected cloud. Next, in step 450, a remote desktop protocol may be used to connect to the VM running cloud-based IDA to permit user-interaction with the cloud-based IDA. For example, a remote desktop protocol may be used to display the output/GUI of cloud-based IDA running on VM 385 in a window on remote client 210. In some embodiments, the remote desktop protocol may be used to display the cloud-based IDA output/GUI in a browser window 310 on remote client 210. For example, a remote desktop protocol such as MS-RDP, VNC, TeamViewer, or a variety of other proprietary and/or non-proprietary protocols may be used to permit user input, GUI/output display, and user interaction with the cloud-based IDA. In some embodiments, remote desktop protocol functionality may be incorporated in a browser plug-in in web browser 310 used for interacting with system 305. Accordingly, in some embodiments, web browser may transparently connect with VM 385 running cloud-based IDA and use the appropriate remote desktop protocol to retrieve the cloud-based IDA output/GUI remotely and send user-input to the cloud-based IDA. For example, cloud-based IDA generated output/GUI may be displayed in a window on web browser 310 on remote client 210.

In step 455, the cloud-based IDA may store or persist any output, application data and/or files on cloud storage. For example, the cloud-based IDA may write to cloud storage 395. In step 460, the cloud-based IDA may terminate. For example, the cloud-based IDA may complete processing of input data and terminate automatically, or may be terminated by explicitly the user, or upon satisfaction of some pre-defined or user-defined criteria. In some embodiments, one or more of these criteria for terminating the application may be stored in a user or application profile for the cloud-based IDA and used by one or more modules of system 305 to terminate the cloud-based IDA.

In step 470, the VM running the application may be torn down dynamically. For example, a special node termination and/or clean-up script may be used by Cloud Coordinator/Gateway 380 to tear down VM 385 and/or sever the remote desktop connection. In some embodiments, VM 385-1 may be dynamically torn down immediately after the termination of the cloud-based IDA. Next, in step 480, data/files stored on the cloud may be synced. For example, data/files stored on cloud storage 395 may be sent to or retrieved by Cloud Agent 315 on thin client 210 and stored locally in an appropriate location or folder.

Note that method 400 is exemplary and for descriptive purposes only and functionality disclosed in one or more steps may be disclosed may be rearranged (re-ordered, combined and/or deleted) in a manner consistent with disclosed embodiments, as would be apparent to one of ordinary skill in the art. For example, Step 470 (VM tear down) may be performed after step 480 (Sync data from cloud). As another example, step 480 may be eliminated. For example, in a situation where storage on the remote client is limited, or if the volume of output data generated by cloud-based IDA is large, step 480 may be eliminated. As a further example, a user may stop the sync of data either manually or automatically by appropriate program settings, when the synchronized data is being transmitted over a wireless 4G/LTE network to save cost.

Note that although the description above uses exemplary cloud infrastructures to describe possible implementations, alternate implementations are envisaged and the methods described could be extended to other cloud infrastructures as would be apparent to one of ordinary skill in the art. Further, although primitives, composite interfaces, and templates have been described as exemplary intermediate infrastructure independent representations, other infrastructure independent intermediate representational schemes may also be used. In some embodiments, software to facilitate conducting the processes described above can be recorded on computer-readable media or computer-readable memory. These include, but are not limited to, hard drives, solid state drives, optical media, non-volatile storage of various kinds, removable media, and the like.

In some embodiments, the methods described herein may be implemented using a variety of wired and/or wirelessly networked processors, various computers, and computing devices, including mobile devices such as smartphones, notebooks, and handheld computers, and various distributed computing systems.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method comprising:
  at a device including one or more processors and a non-transitory memory:
  receiving a request from a remote client device to launch a cloud-based interactive desktop application (IDA) on a Virtual Machine (VM) running on at least one of a plurality of cloud infrastructures;
  in response to receiving the request, deploying an implementation of a cloud-agnostic template on the VM for the cloud-based IDA, wherein the cloud-agnostic template is agnostic of the plurality of cloud infrastructures, and the implementation is deployed using one or more cloud-specific libraries for the VM, the one or more cloud-specific libraries are derived from the cloud-agnostic template, including a representation of an underlying pattern of resource utilization of the cloud-based IDA;

dynamically building clusters on the VM to execute the cloud-based IDA, including, without user interaction, adjusting the number of nodes supporting the VM to run the cloud-based IDA, wherein the cloud-based IDA is an interactive application program run locally on the VM, and one of the nodes is responsible for a control and operation of at least a portion of the VM; and directing an application on the remote client device to connect to the VM on the at least one of the plurality of cloud infrastructures to facilitate a remote interaction with the cloud-based IDA, wherein the application on the remote client device comprises a remote desktop protocol suite, which facilitates the remote interaction with the cloud-based IDA, and provides a cloud-based application Graphical User Interface (GUI) different from a virtual desktop associated with the VM.

2. The method of claim 1, wherein the remote interaction comprises:
displaying the cloud-based application GUI associated with the cloud-based IDA on the remote client device; and
sending at least one input associated with the cloud-based IDA from the remote client device to the cloud-based IDA, the at least one input comprising input obtained through the cloud-based application GUI.

3. The method of claim 2, wherein the remote interaction occurs through a web browser on the remote client device.

4. The method of claim 1, wherein the application on the remote client device is a web browser and the remote desktop protocol suite is provided by a browser plugin.

5. The method of claim 1, wherein the remote desktop protocol suite comprises at least one of:
a presentation layer protocol,
a framebuffer protocol,
a terminal services protocol, or
a proprietary desktop sharing protocol.

6. The method of claim 1, further comprising synchronizing one or more data files between the remote client device and the cloud-based IDA.

7. The method of claim 6, wherein the one or more data files comprise at least one of: one or more input data files or, one or more output data files, and synchronizing the one or more data files between the remote client device and the cloud-based IDA further comprises at least one of:
copying the one or more input data files from the remote client device to cloud-based storage used by the cloud-based IDA as part of an initialization routine associated with the cloud-based IDA, wherein the one or more input data files are used by the cloud-based IDA during execution; or,
copying the one or more output data files from the cloud-based storage used by the cloud-based IDA to the remote client device as part of a termination routine associated with the cloud-based IDA, wherein the one or more output data files are output by the cloud-based IDA.

8. The method of claim 1, wherein the remote client device is at least one of:
a tablet computer,
a handheld computer;
a smartphone,
a netbook, or
a laptop.

9. The method of claim 1, further comprising:
dynamically tearing down the VM immediately following termination of the cloud-based IDA.

10. An apparatus comprising:
a processor and a non-transitory memory;
a communications interface operable to communicatively link the apparatus to a remote client device;
wherein the non-transitory memory includes program instructions that when executed by the processor cause the apparatus to:
receive a request from the remote client device to launch a cloud-based interactive desktop application (IDA) on a Virtual Machine (VM) running on at least one of a plurality of cloud infrastructures;
in response to receiving the request, deploy an implementation of a cloud-agnostic template on the VM for the cloud-based IDA, wherein the cloud-agnostic template is agnostic of the plurality of cloud infrastructures, and the implementation is deployed using one or more cloud-specific libraries for the VM, the one or more cloud-specific libraries are derived from the cloud-agnostic template, including a representation of an underlying pattern of resource utilization of the cloud-based IDA;
dynamically build clusters on the VM to execute the cloud-based IDA, including, without user interaction, adjusting the number of nodes supporting the VM to run the cloud-based IDA, wherein the cloud-based IDA is an interactive application program run locally on the VM, and one of the nodes is responsible for a control and operation of a fraction of the VM; and
cause a software agent on the remote client device to connect to the VM on the at least one of the plurality of cloud infrastructures to facilitate a remote interaction with the cloud-based IDA, wherein the software agent comprises a remote desktop protocol suite to facilitate the remote interaction with the cloud-based IDA and provides a cloud-based application Graphical User Interface (GUI) different from a virtual desktop associated with the VM.

11. The apparatus of claim 10, wherein the remote interaction comprises:
displaying the cloud-based application GUI associated with the cloud-based IDA on a display of the remote client device; and
sending at least one input associated with the cloud-based IDA GUI from the apparatus to the cloud-based IDA, the at least one input comprising input obtained through the the cloud-based application GUI.

12. The apparatus of claim 10, wherein the remote client device is at least one of:
a tablet computer,
a handheld computer;
a smartphone,
a netbook, or
a laptop.

13. The apparatus of claim 10, wherein the one or more processors are further configured to:
synchronize one or more data files stored on the remote client device and the cloud-based IDA.

14. The apparatus of claim 13, wherein the one or more data files comprise at least one of: one or more input data files or, one or more output data files, and to synchronize the one or more data files, the one or more processors are configured to perform at least one of:

instruct the software agent to initiate the copying of the one or more input data files stored on the apparatus to cloud-based storage used by the cloud-based IDA as part of an initialization routine associated with the cloud-based IDA, wherein the one or more input data files are used by the cloud-based IDA during execution; or instruct the software agent to initiate the copying of the one or more output data files from the cloud-based storage used by the cloud-based IDA to storage on the apparatus as part of a termination routine associated with the cloud-based IDA, wherein the one or more output data files are output by the cloud-based IDA.

15. The apparatus of claim 10, wherein the remote desktop protocol suite comprises at least one of:
   a presentation layer protocol,
   a framebuffer protocol,
   a terminal services protocol, or
   a proprietary desktop sharing protocol.

16. A non-transitory computer-readable medium comprising instructions, which when executed by a processor cause the processor to perform steps in a method comprising:
   receiving a request from the remote client device to launch a cloud-based interactive desktop application (IDA) on a Virtual Machine (VM) running on at least one of a plurality of cloud infrastructures;
   in response to receiving the request, deploying an implementation of a cloud-agnostic template on the VM for the cloud-based IDA, wherein the cloud-agnostic template is agnostic of the plurality of cloud infrastructures, and the implementation is deployed using one or more cloud-specific libraries for the VM, the one or more cloud-specific libraries are derived from the cloud-agnostic template, including a representation of an underlying pattern of resource utilization of the cloud-based IDA;
   dynamically building clusters on the VM to execute the cloud-based IDA, including, without user interaction, adjusting the number of one or more nodes supporting the VM to run the cloud-based IDA, wherein the cloud-based IDA is an interactive application program run locally on the VM, and one of the nodes is responsible for a control and operation of a fraction of the VM; and
   causing an application on the remote client device to connect to the VM on the at least one of the plurality of cloud infrastructures to facilitate a remote interaction with the cloud-based IDA, wherein the application on the remote client device comprises a remote desktop protocol suite, which facilitates the remote interaction with the cloud-based IDA and provides a cloud-based application Graphical User Interface (GUI) different from a virtual desktop associated with the VM.

17. The computer-readable medium of claim 16, wherein the remote interaction comprises:
   displaying the cloud-based application GUI associated with the cloud-based IDA on the remote client device; and
   sending at least one input associated with the cloud-based IDA from the remote client device to the cloud-based IDA, the at least one input comprising input obtained through the cloud-based application GUI.

18. The computer-readable medium of claim 16, wherein the application on the remote client device is a web browser and the remote desktop protocol functionality is provided by a browser plugin.

19. The computer-readable medium of claim 16, wherein the remote desktop protocol suite comprises at least one of:
   a presentation layer protocol,
   a framebuffer protocol,
   a terminal services protocol, or
   a proprietary desktop sharing protocol.

20. The computer-readable medium of claim 16, further comprising:
   dynamically tearing down the VM immediately following termination of the cloud-based IDA.

21. The apparatus of claim 10, wherein the one or more processors are further configured to:
   dynamically tear down the VM immediately following termination of the cloud-based IDA.

* * * * *